(12) United States Patent
Sip

(10) Patent No.: US 8,289,292 B2
(45) Date of Patent: Oct. 16, 2012

(54) ELECTRONIC DEVICE WITH TOUCH INPUT FUNCTION AND TOUCH INPUT METHOD THEREOF

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 395 days.

(21) Appl. No.: 12/649,355

(22) Filed: Dec. 30, 2009

(65) Prior Publication Data

US 2011/0050599 A1    Mar. 3, 2011

(30) Foreign Application Priority Data

Aug. 25, 2009  (CN) .......................... 2009 1 0306050

(51) Int. Cl.
*G06F 3/41* (2006.01)
(52) U.S. Cl. ...................................................... 345/173
(58) Field of Classification Search .................. 345/1.1, 345/104, 168–184, 158; 178/18.09, 18.05, 178/20.01, 20.02, 19.04; 358/1.15, 1.13, 358/1.9
See application file for complete search history.

(56) References Cited

U.S. PATENT DOCUMENTS

| | | | | |
|---|---|---|---|---|
| 6,628,269 B2* | 9/2003 | Shimizu | ........................ | 345/173 |
| 7,612,759 B2* | 11/2009 | Horiuchi | ........................ | 345/104 |
| 7,750,893 B2* | 7/2010 | Hashimoto et al. | ........... | 345/173 |
| 7,821,780 B2* | 10/2010 | Choy | ........................ | 361/679.06 |
| 7,911,626 B2* | 3/2011 | Ferlitsch | ........................ | 358/1.13 |
| 8,094,129 B2* | 1/2012 | Izadi et al. | ........................ | 345/173 |
| 8,125,454 B2* | 2/2012 | Kong et al. | ........................ | 345/173 |
| 2001/0013861 A1* | 8/2001 | Shimizu | ........................ | 345/173 |
| 2005/0106538 A1* | 5/2005 | Freeman et al. | ........................ | 434/167 |
| 2006/0034042 A1* | 2/2006 | Hisano et al. | ........................ | 361/681 |
| 2006/0044214 A1* | 3/2006 | Hong | ........................ | 345/1.1 |
| 2006/0092132 A1* | 5/2006 | Chen | ........................ | 345/157 |
| 2006/0097991 A1* | 5/2006 | Hotelling et al. | ........................ | 345/173 |
| 2006/0227106 A1* | 10/2006 | Hashimoto et al. | ........................ | 345/157 |
| 2006/0256090 A1* | 11/2006 | Huppi | ........................ | 345/173 |
| 2007/0171188 A1* | 7/2007 | Waites | ........................ | 345/156 |
| 2008/0122803 A1* | 5/2008 | Izadi et al. | ........................ | 345/175 |
| 2008/0291173 A1* | 11/2008 | Suzuki | ........................ | 345/173 |
| 2009/0073134 A1* | 3/2009 | Huang et al. | ........................ | 345/173 |
| 2009/0096757 A1* | 4/2009 | Hotelling et al. | ........................ | 345/173 |
| 2009/0153509 A1* | 6/2009 | Jiang et al. | ........................ | 345/173 |
| 2009/0160796 A1* | 6/2009 | Jiang et al. | ........................ | 345/173 |
| 2009/0231288 A1* | 9/2009 | Liao | ........................ | 345/173 |
| 2010/0053092 A1* | 3/2010 | Chen et al. | ........................ | 345/173 |

* cited by examiner

*Primary Examiner* — Prabodh M Dharia
(74) *Attorney, Agent, or Firm* — Altis Law Group, Inc.

(57) ABSTRACT

An electronic device, includes a first touch panel, a second touch panel, a processing unit, a first touch controller and a second touch controller, the first and the second touch controller are used to determine touch information according to touch signals produced by the first touch panel and the second touch panel respectively. The processing unit determines the touch mode is a single-surface touch mode if only receives the touch information from the first touch controller, and determines gesture according to the touch information and executes the function associated with the gesture. The processing unit determines the touch mode is a double-surface touch mode if receives the touch information from both the first touch controller and the second touch controller, determines an combined gesture according to the touch information from the first and the second touch controller, and executes function associated with the combined gesture.

5 Claims, 5 Drawing Sheets

ELECTRONIC DEVICE WITH TOUCH INPUT FUNCTION AND TOUCH INPUT METHOD THEREOF

BACKGROUND

1. Technical Field

The disclosure relates to electronic devices and, particularly, to an electronic device equipped with touch panel.

2. Description of Related Art

Nowadays, more and more electronic devices employ touch screen as an input device, people can use the touch screen to input commands easily. For example, people can directly click an icon displayed on the touch screen to execute the function associated with the icon.

The multipoint touch screen technique is introduced to facilitate tracking of more than one touch occurring on the screen at the same time.

However, multipoint touch screens usually need two hands to input commands, namely, one hand is needed to hold an electronic device equipped with the multipoint touch screen, and the other hand is needed to touch the multipoint touch screen. Therefore, if the user has only one hand free then they may not be able to input desired commands.

Therefore, it is beneficial to provide an electronic device to overcome the limitations described.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Figure 1:
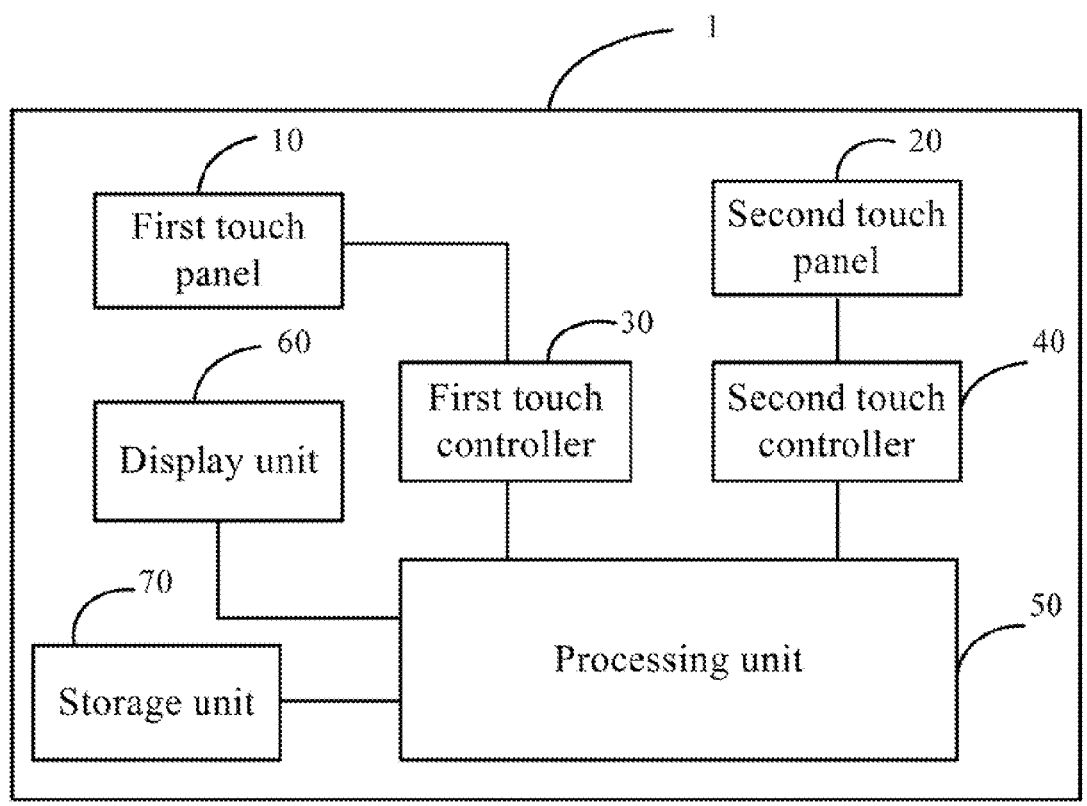
FIG. 1 is a block diagram of an electronic device in accordance with an exemplary embodiment.

Referring to FIG. 1, an electronic device 1 with touch input function is disclosed. The electronic device 1 includes a first touch panel 10, a second touch panel 20, a first touch controller 30, a second touch controller 40, a processing unit 50, and a display unit 60.

The first touch panel 10 is a transparent touch panel and is located on the display unit 60 and combines with the display unit 60 to form a touch screen. The second touch panel 20 is located at another side of the electronic device 1 and can be transparent or not. The size of the first touch panel 10 and the second touch panel 20 can be the same or not. In the embodiment, the first touch panel 10 and the second touch panel 20 are both multipoint touch panels. The touch sensitive technology applied on the first touch panel 10 and the second touch panel 20 can be resistive, capacitive, infrared, surface acoustic wave, electromagnetic, near field imaging, etc.

The first touch panel 10 and second touch panel 20 are configured to produce touch signals in response to user operations. The first touch controller 30 is connected to the first touch panel 10 and is configured to receive the touch signals from the first touch panel 10 and determine the touch information including a touch position and a touch path according to the touch signals. The second touch controller 40 is connected to the second touch panel 20 and is also configured to receive the touch signals from the second touch panel 20 and determine the touch information including a touch position and a touch path according to the touch signals.

The processing unit 50 is connected to the first touch controller 30 and the second touch controller 40 and is configured to receive the touch information determined by the first touch controller 30 and the second touch controller 40, and determine a touch mode according to the received touch information. If the processing unit 50 only receives the touch information from the first touch controller 30, the processing unit 50 determines the touch mode is a single-surface touch mode, namely, the user need only touch the first touch panel 10 to input commands. In the single-surface touch mode, the processing unit 50 determines the gesture of the touch operation of the user according to the touch information and executes the function associated with the gesture. If the processing unit 50 receives the touch information from both the first touch controller 30 and the second touch controller 40, the processing unit 50 determines the touch mode is a double-surface touch mode, namely, the user both touches the first touch panel 10 and the second touch panel 20. The processing unit 50 combines the touch information from first touch controller 30 and the second touch controller 40 and determines a combined gesture of the touch operation of the user according to the combined touch information, and then, the processing unit 50 executes the function associated with the combined gesture in the double-surface touch mode.

Figure 2:
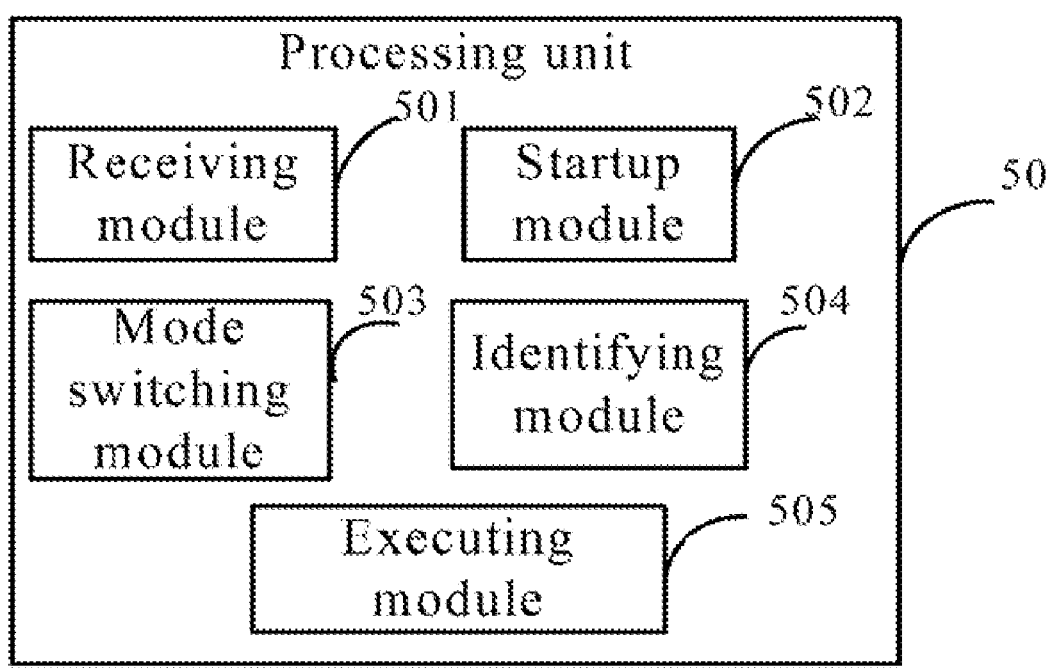
FIG. 2 is a block diagram of a processing unit of the electronic device of FIG. 1.

Referring also to FIG. 2, in the embodiment, the processing unit 50 includes a receiving module 501, a startup module 502, a mode switching module 503, an identifying module 504, and an executing module 505. The receiving module 501 is configured to receive the touch information from the first touch controller 30 and/or the second touch controller 40. In the initial state, the second touch controller 40 is disabled, when the receiving module 501 receives the touch information from the first touch controller 30, the startup module 502 enables the second touch controller 40. The mode switching module 503 sets the touch mode according to the touch information received by the receiving module 501. For example, if the receiving module 501 only receives the touch information from the first touch controller 30, the mode switching module 503 sets the touch mode to the single-surface touch mode, if the receiving module 501 receives the touch information from both the first touch controller 30 and the second touch controller 40, the mode switching module 503 sets the touch mode to the double-surface touch mode.

In the single-surface touch mode, the identifying module 504 identifies gestures according to the touch information from the first touch controller 30. The executing module 505 executes the function associated with the gestures accordingly in the single-surface touch mode. In the double-surface touch mode, the identifying module 504 combines the touch information from the first touch controller 30 and the second touch controller 40 to form a combined touch information, and identifies combined gestures according to the combined touch information. The executing module 505 executes the function associated with the combined gestures accordingly.

In the embodiment, the storage unit 70 stores a first mapping table (not shown) defining the relationship between gestures and functions in the single-surface touch mode and a second mapping table defining relationship between gestures and functions in the double-surface touch module. For example, in the first mapping table, a "dragging touch" corresponds to a function to move an image displayed on the display unit 60, then the executing module 505 executes the function to move the image when the identifying module 504 determines the gesture is dragging in the single-surface touch mode.

Figure 3:
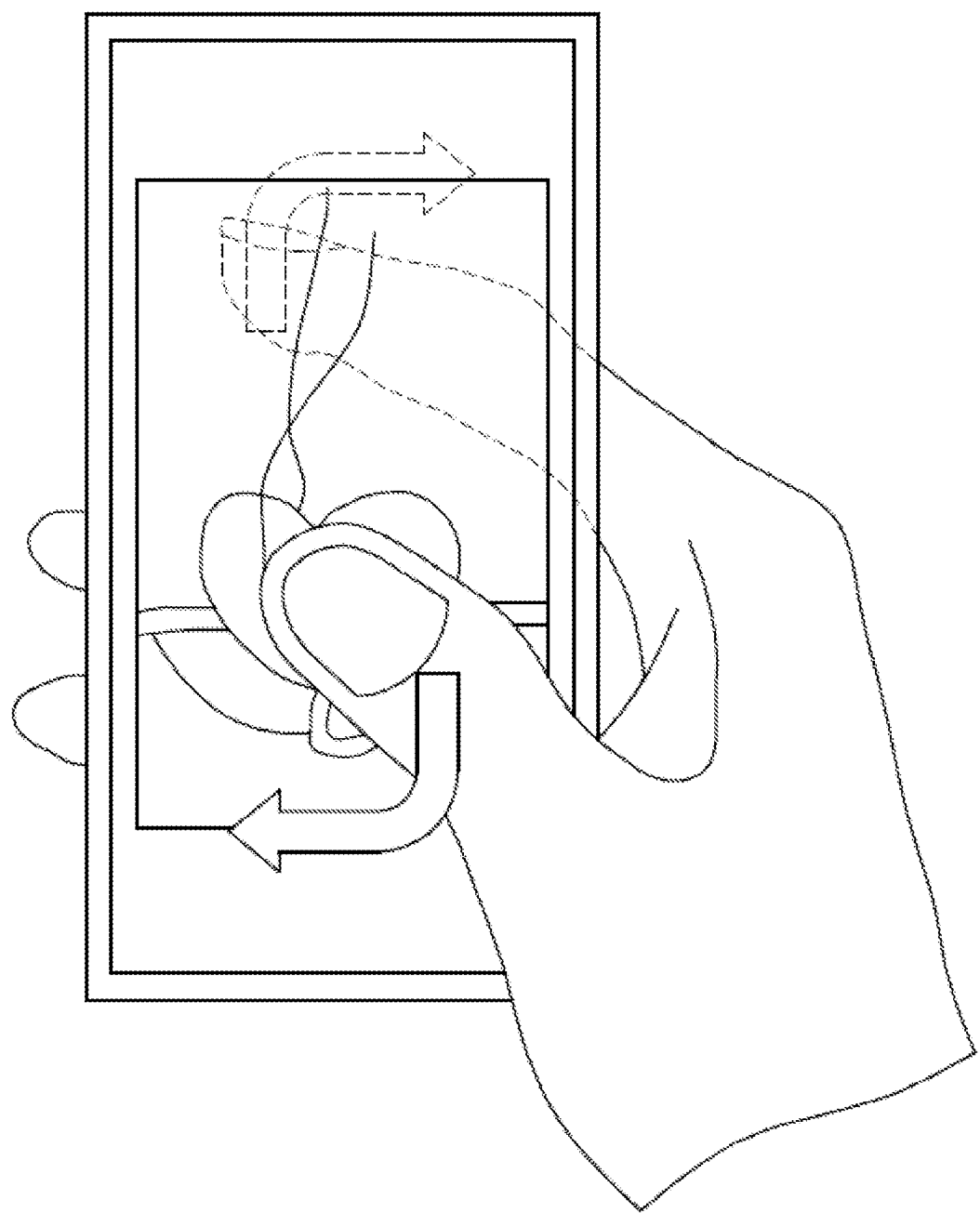
FIG. 3 is a schematic diagram illustrating a first operation based on the electronic device of FIG. 1.

Referring also to FIG. 3, the user can operate the electronic device 1 by one hand. Namely, the user touches the first touch panel 10 with their thumb while touching the second touch panel 20 with their the index finger, as described above, when the first touch panel 10 and the second touch panel 20 are both touched by the user at the same time, the electronic device 1 is set to the double-surface touch mode. As shown in FIG. 3, the user can touch the first touch panel 10 with the thumb and touch the second panel 20 with the index finger. They can use a touching gesture such as the thumb moving clockwise on the first touch panel 10 and the index finger moving clockwise on the second touch panel 20. The first touch panel 10 produces a first touch signal and the second touch panel 10 produces a second touch signal accordingly. The first touch controller 30 produces the touch information indicating the clockwise movement of the thumb according to the first touch signal produced by the first touch panel 10 and the second touch controller 40 produces the touch information indicating the anticlockwise movement of the index finger according to the second touch signal produced by the second touch panel 20. The identifying module 504 combines the touch information from the first touch controller 30 and the second touch controller 40 to form the combined touch information indicating the movement of the thumb and the index finger, and identifies the combined gesture is a rotation gesture according to the combined touch information. The executing module 505 executes the function associated with the combined gestures accordingly. In the embodiment, the second mapping table defines the function associated with the rotation gesture is to rotate the image displayed on the display unit 60, and so the executing module 505 rotates the image displayed on the display unit 60 accordingly.

Figure 4:
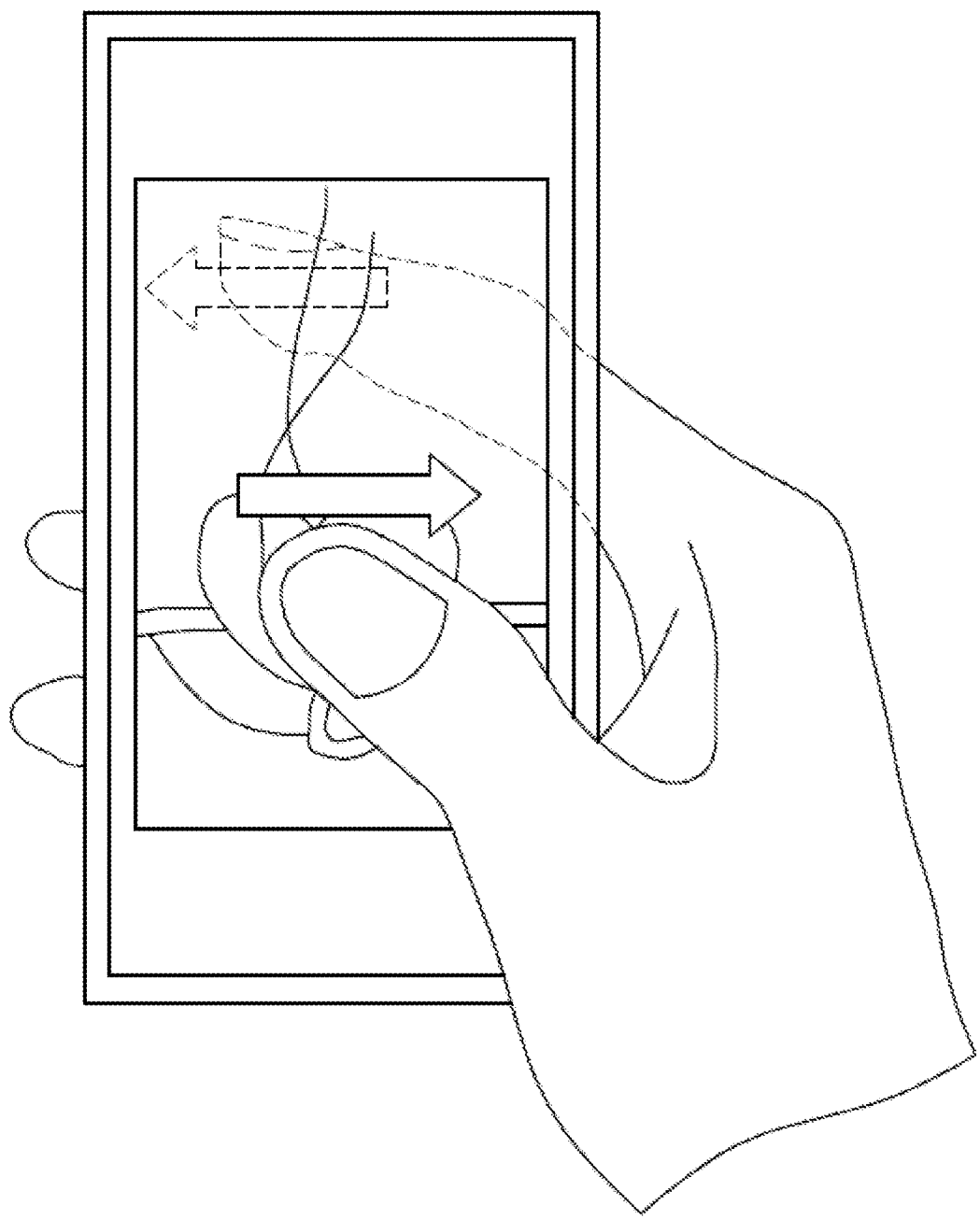
FIG. 4 is a schematic diagram illustrating a second operation based on the electronic device of FIG. 1.

Referring also to FIG. 4, when the thumb slides horizontally right on the first touch panel 10 and the index finger slides horizontally left on the second touch panel 20, the first touch panel and the second touch panel produce corresponding touch signals, and the first touch controller 30 produce the touch information indicating the horizontally right movement of the thumb and the second touch controller 40 produce the touch information indicating the horizontally left movement of the index finger according to the touch signals. The identifying module 504 combines the touch information from the first touch controller 30 and the second touch controller 40 to form a combined touch information indicating the movement of the thumb and the index finger, and identifies a combined gesture is an separate gesture according to the combined touch information, the executing module 505 executes corresponding function according to the separate gesture. For example, if the second mapping table defines the function associated with the separate gesture is to zoom in the image displayed on the display unit 60, the executing module 505 enlarges the image displayed on the display unit 60 accordingly.

Therefore, in the double-surface touch mode, the user can use only one hand to operate the electronic device to achieve the effect by use two hands.

Figure 5:
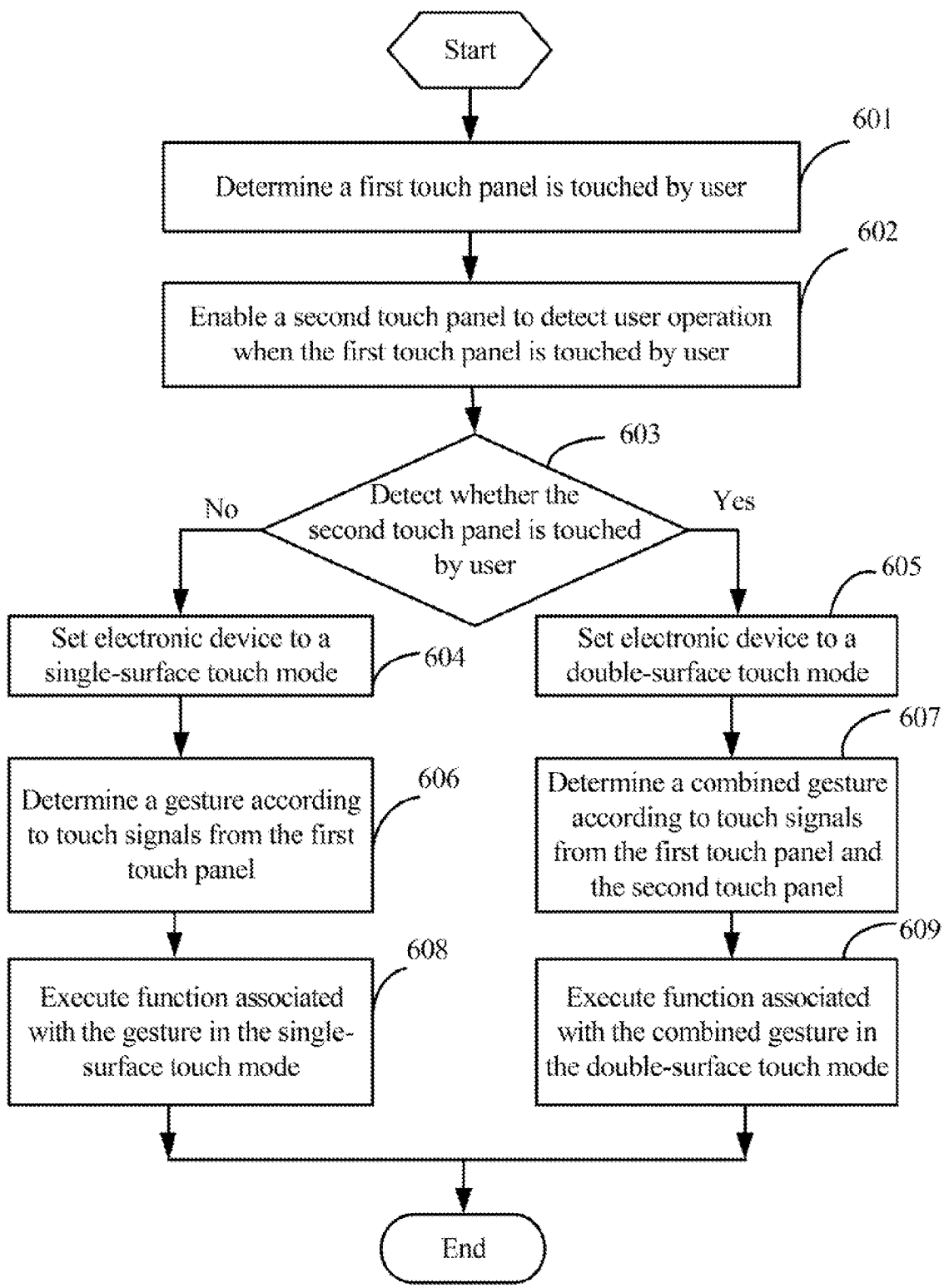
FIG. 5 is a flowchart illustrating a touch input method applied in the electronic device of FIG. 1.

FIG. 5 is flowchart illustrating a touch input method applied in the electronic device of FIG. 1. In step S601, the processing unit 50 detects the first touch panel 10 is touched by a user, namely, the first touch panel 10 produces touch signals in response to user operations and the first touch controller 30 determines the touch information according to the touch signals and the receiving module 501 receives the touch information from the first touch controller 30.

In step S602, the processing unit 50 enables the second touch panel to detect user operations, namely, the startup module 502 enables the second touch controller 40 after the receiving module 201 receives the touch information from the first touch controller 30.

In step S603, the processing unit 50 detects whether the second touch panel is touched by user, namely the mode switching module 503 detects whether the receiving module 501 receives the touch information from the second touch controller 40.

If the second touch panel 20 do not touched by user, in step S604, the mode switching module 503 sets the touch mode of the electronic device to single-surface touch mode.

In step S606, the identifying module 504 determines the gesture according to the touch information from the first touch controller 30.

In step S608, the executing module 505 executes the function associated with the gesture in the single-surface touch mode.

If the second touch panel 20 is touched by user, in step S605, the mode switching module 503 sets the mode of the electronic device to double-surface touch mode.

In step S607, the identifying module 504 determines a combined gesture according to the touch information from the first touch controller 30 and the second touch controller 40.

In step S609, the executing module 505 executes the function associated with the combined gesture in the double-surface touch mode.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:
1. An electronic device comprising:
a first touch panel and a second touch panel both configured to produce touch signals in response to user operations;
a first touch controller connected to the first touch panel and configured to determine touch information including a touch position and a touch path when receiving the touch signals from the first touch panel;
a second touch controller connected to the second touch panel and configured to determine touch information including a touch position and a touch path when receiving the touch signals from the second touch panel; and
a processing unit connected to both the first touch controller and the second touch controller, the processing unit comprising:
a receiving module configured to receive touch information from the first touch controller and the second touch controller;
a startup module configured to enable the second touch controller when the receiving module receives the touch information from the first touch controller;
a mode switching module configured to set the electronic device to single-surface touch mode when the receiving module only receives the touch information from the first touch controller, and set the electronic device to double-surface touch mode when the receiving module receives the touch information both from the first touch controller and the second touch controller;

an identifying module configured to determine a gesture according to the touch information from the first touch controller in the single-surface touch mode or determine a combined gesture according to the touch information from the first touch controller and the second touch controller in the double-surface touch mode; and an executing module configured to execute the function associated with the gesture in the single-surface touch mode or the function associated with the combined gesture in the double-surface touch mode.

2. The electronic device of claim 1, further comprising a storage unit, wherein the storage unit stores a first mapping table defining relationship between functions and gestures in the single-surface touch mode and a second mapping table defining relationship between functions and gestures in the double-surface touch mode; the executing module executes the function associated with the gesture according to the first mapping table in the single-surface mode and executes the function associated with the gesture according to the second mapping table in the double-surface mode.

3. The electronic device of claim 1, further comprising a display unit, wherein the first touch panel is a transparent touch panel and located above the display unit, and the first touch panel combines with the display unit to form a touch screen, the second touch panel is located at the back of the electronic device.

4. The electronic device of claim 3, wherein the first touch panel and the second touch panel both are multipoint touch panels.

5. A touch input method used for an electronic device, the electronic device comprises a first touch panel and a second touch panel; wherein the method comprising:

determining the first touch panel is touched by user;

enabling the second touch panel to detect user operations after the first touch panel is touched by user;

detecting whether the first touch panel and the second touch panel are touched by user after the first is touched by user;

setting the electronic device to double-surface touch mode if the first touch panel and the second touch panel are both touched by user;

determining a combined gesture according to touch signals from the first touch panel and the second touch panel;

determining the function associated with the combined gesture in the double-surface touch mode and executing the function accordingly;

setting the electronic device into single-surface touch mode if only the first touch panel is touched by user;

determining a gesture according to touch signal from the first touch panel; and determining the function associated with the gesture in the single-surface touch mode and executing the function accordingly.

* * * * *